Patented Nov. 1, 1932

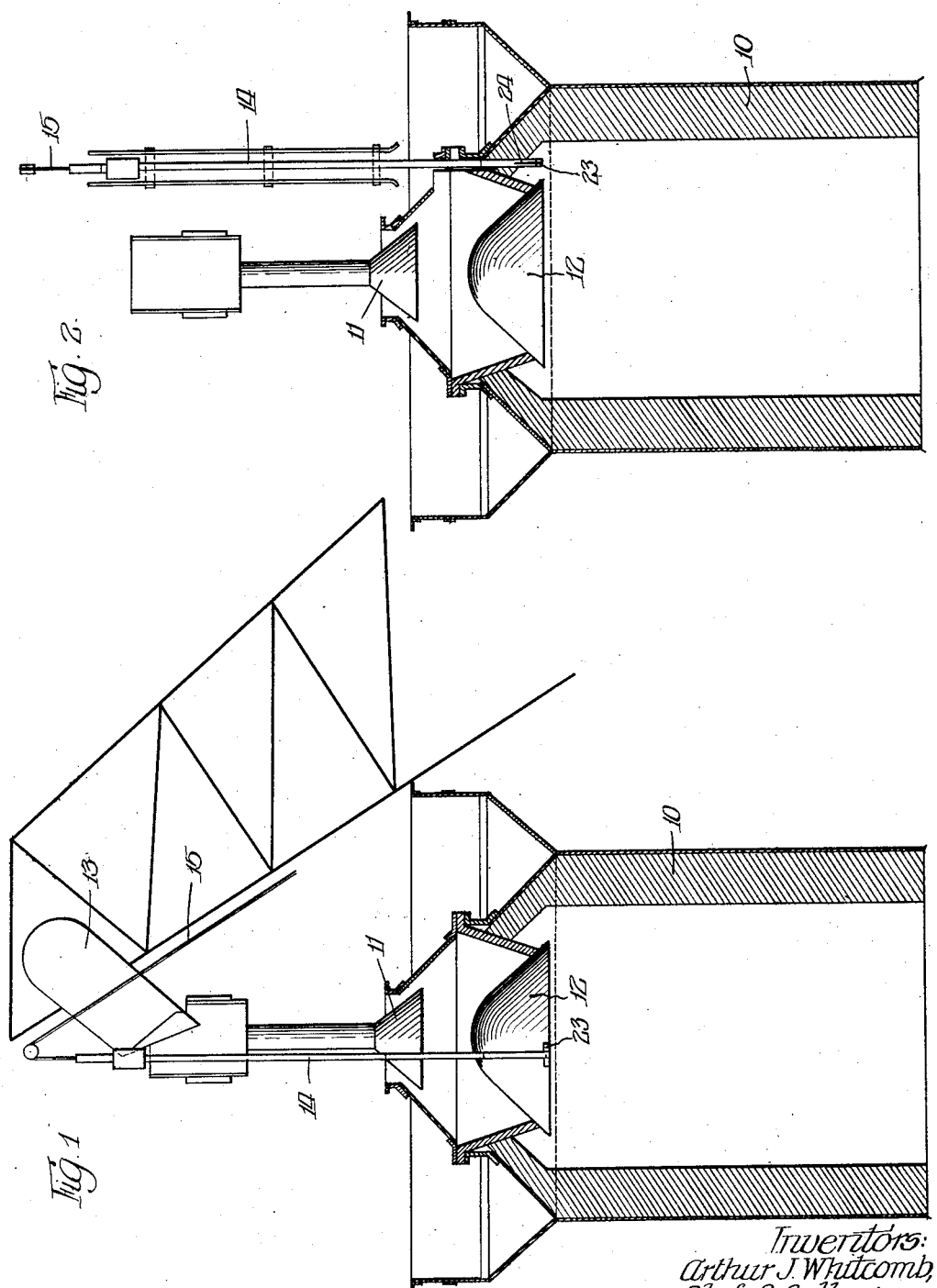

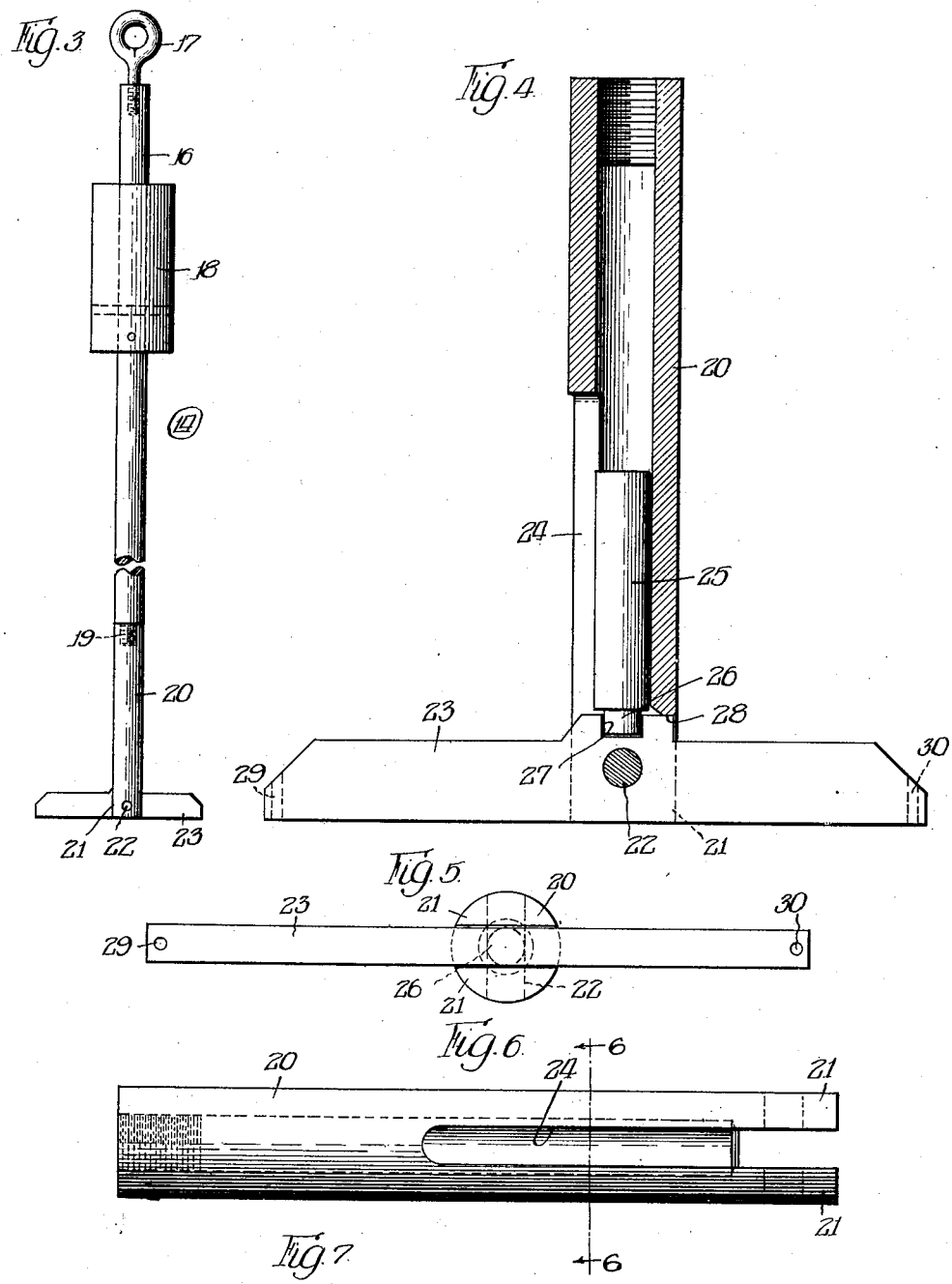

1,885,397

UNITED STATES PATENT OFFICE

ARTHUR J. WHITCOMB AND OLAF C. CALLOW, OF CHICAGO, ILLINOIS, ASSIGNORS TO FREYN ENGINEERING COMPANY, OF CHICAGO, ILLINOIS, A CORPORATION OF MAINE

TEST ROD

Application filed April 12, 1929. Serial No. 354,494.

The present invention relates to test rods.

The present invention has been described and will be illustrated in connection with test rods for blast furnaces. In blast furnace practice it is common to provide a test rod for measuring the level of the charge within the blast furnace, which test rod is longitudinally reciprocable and may be intermittently operated, or may rest continually upon the charge within a blast furnace except when material is being dumped into said blast furnace. In order that the test rod may give true indications of the level of the charge, means should be provided to prevent the test rod from sinking into the charge.

An object of the present invention is to provide an improved test rod suitable for blast furnace work which may be readily inserted into a furnace and which presents a relatively broad bearing surface for resting upon the charge whose level is to be measured.

A further object is to provide a test rod assembly having a folding foot, which assembly may be inserted into a blast furnace through the usual aperture for receiving the test rod, and which is not at all likely to get out of adjustment in service.

Further objects will appear as the description proceeds.

Referring to the drawings—

Figures 1 and 2 are more or less schematic views illustrating a typical location of a test rod within a blast furnace;

Figure 3 is a view in side elevation of a test rod assembly embodying the principles of the present invention;

Figure 4 is a view on an enlarged scale, parts being shown in section, of part of the mechanism shown in Figure 3;

Figure 5 is a bottom plan view of the structure shown in Figure 4;

Figure 6 is a view in side elevation of one of the elements shown in Figures 3, 4 and 5; and Figure 7 is a sectional view taken along the plane indicated by the arrows 7—7 of Figure 6.

Referring first to Figures 1 and 2, the numeral 10 indicates a blast furnace having the usual charging bells 11 and 12 disposed in series with one another. The numeral 13 indicates a skip disposed in position to deposit material upon said charging bells 11 and 12. The numeral 14 indicates a test rod capable of longitudinal movement in a vertical direction, being guided by any preferred means. Said test rod 14, according to usual practice, has a loose sliding fit within the superstructure of the blast furnace 10. A cable 15 is connected to the upper extremity of the test rod 14 and serves as means for lifting said test rod.

Referring now to Figure 3, the illustrated embodiment of the present invention includes the rod 16, which rod is provided at its upper extremity with the eye bolt 17 adapted to receive the cable 15. Secured to the rod 16 adjacent to the upper extremity thereof is the stop member 18 adapted to contact with the superstructure of the blast furnace 10 to limit upward movement of the test rod. The rod 16 has its lower extremity reduced in diameter and screw-threaded, as indicated by the numeral 19, which screw-threaded portion is adapted to receive and hold the elongated member or sleeve 20. The external diameter of the sleeve 20 is preferably substantially equal to the external diameter of the rod 16.

The sleeve 20 is bifurcated at its lower extremity, the bifurcations thereof being indicated by the numerals 21—21. Said bifurcations 21—21 are apertured for the reception of a pin 22 for pivotally supporting the elongated folding foot 23. Said sleeve 20 is provided with a longitudinal slot 24 communicating with the opening between the bifurcations 21—21, which slot 24 permits the insertion of one side of the folding foot 23 into said sleeve 20, whereby said foot is disposed substantially in line with said sleeve 20 and the rod 16. Slidably disposed within the sleeve 20 is the locking member 25 having a reduced extremity 26 adapted to seat itself within a socket 27 disposed in the upper side of the folding foot 23 (see Fig. 4). It will be understood that the length of the sleeve 20 relative to the length of locking member 25 should be such that said locking member 25 may be disposed within the upper portion of sleeve 20 when the foot 23 is in folded relationship with the sleeve 20. It will be understood also that the slot 24 in the sleeve 20 should be of less width than the diameter of the locking member 25, whereby there will be no danger of said locking member 25 being lost through said slot 24. It will be noted that the locking member 24 is disposed entirely within the sleeve 20. The swinging side of the foot 23 adapted to enter the slot 24 should be heavier than the other swinging side of the foot, whereby the foot 23 will have a natural bias to swing out of said slot 24.

It will be noted from an inspection of Figure 4 that the upper side of the folding foot 23 is adapted to abut the surface 28 defining the uppermost region of the opening provided by the bifurcations 21—21. It will be clear, therefore, that when the foot 23 is allowed to swing freely, it will be held in fixed relationship with the sleeve 25 by said wall 28, and, moreover, will be held in said fixed relationship by reason of the engagement of the reduced extremity 26 of the locking member 25 within the socket 27 of the folding foot 23.

The swinging extremity of the foot 23 adapted to enter the slot 24 may be provided with the aperture 29 and the other extremity of said foot may be provided with the aperture 30. Said apertures may be used for securing wires or cords to said foot, for a purpose which will be referred to presently.

In mounting the test rod 14 within the blast furnace 10, the locking member 25 will be disposed in the upper portion of sleeve 20 and the foot 23 will be disposed in substantial alignment with said sleeve 20. If preferred, a wire or cord may be secured to each extremity of the foot 23, the apertures 29 and 30 being utilized for this purpose. The aperture in the superstructure of the blast furnace for receiving the test rod 14 ordinarily provides sufficient play to permit the use of the wires or cords referred to. As the test rod 14 is lowered into the furnace, the wire or cord secured to the foot 23 through aperture 29 may be held taut until the test rod has been inserted sufficiently far so that the folding foot 23 may clear the superstructure of said blast furnace 10. The cord attached through aperture 29 may then be allowed to become loose and pull may be applied to the cord attached through the aperture 30 to swing the foot 23 into the position shown in Figures 3 and 4; or, if preferred, the wires or cords may be omitted, the effect of gravity being relied upon to cause the foot 23 to swing into the position shown in said figures. As the foot 23 swings toward the position shown in Figure 4, the locking member 25 will descend and the reduced extremity 26 of said locking member 25 will seat itself within the socket 27, positively locking said foot 23 in right-angular relationship with sleeve 20. In the event that a wire or cord is secured to the foot through the aperture 29, said foot may be tested by exerting a pull upon said wire or cord. If the locking member 25 is in locking relationship with said foot 23, such a pull will not result in any swinging movement of the foot 23.

Though a preferred embodiment of the present invention has been described in detail, many modifications will occur to those skilled in the art. It is intended to cover all such modifications that fall within the scope of the appended claims.

What is claimed is—

1. A test rod comprising an elongated member and a foot hinged thereto at an extremity thereof, said elongated member and said foot having cooperating portions for holding said foot in right-angular relationship with said elongated member, said foot when in said relationship constituting the extremity of said test rod, and a reciprocable member slidable relative to said elongated member independently of said foot for locking said foot in predetermined relationship with said elongated member.

2. In a test member, in combination, an elongated cylindrical member, a foot pivoted thereto at an extremity thereof and a sliding member slidable within said cylindrical member independently of said foot and adapted to have locking relationship with said foot, said foot when in operative relationship with said elongated member constituting the extremity of said test member.

3. A test member including an elongated member, an elongated foot pivoted to one extremity of said elongated member, said elongated member being recessed for the reception of one swinging extremity of said foot, and a reciprocable member within the recess of said elongated member adapted to lock said foot in predetermined relationship with said elongated member, said reciprocable member being disposed entirely within the cross-sectional boundaries of said elongated member.

4. In a test member, in combination, an elongated columnar member having one of its extremities bifurcated, and an elongated foot disposed between the bifurcations of and pivoted to said elongated member, said elongated member adjacent to said bifurcations being recessed for the reception of one swinging extremity of said foot.

5. In a test member, in combination, an elongated columnar member having one of its extremities bifurcated, an elongated foot disposed between the bifurcations of and pivoted to said elongated member, said elongated member adjacent to said bifurcations being recessed for the reception of one swinging extremity of said foot, and a locking member slidable relative to said elongated member adapted by gravity to lock said foot in predetermined angular relationship with said elongated member.

6. In a test member, in combination, an elongated columnar member having one of its extremities bifurcated, and an elongated foot disposed between said bifurcations and pivoted to said elongated member, said elongated member adjacent to said bifurcations being recessed for the reception of one swinging extremity of said foot, the extremities of said foot being fashioned for the attachment of cord members for the manipulation of said foot.

7. In a test member, in combination, an elongated columnar member having one of its extremities bifurcated, an elongated foot disposed between said bifurcations and pivoted to said elongated member, said elongated member adjacent to said bifurcations being recessed for the reception of one swinging extremity of said foot, and a locking member slidable relative to said elongated member adapted by gravity to lock said foot in predetermined angular relationship with said elongated member, the extremities of said foot being fashioned for the attachment of cord members for the manipulation of said foot.

8. In a test member, in combination, an elongated member, an elongated foot pivoted to one extremity of said elongated member adapted to extend for material distances on both sides of the longitudinal axis of said elongated member and adapted to be folded into substantial alignment with said elongated member, said foot being heavier on one side of its pivotal mounting than on the other side thereof, said foot and said elongated member having cooperating portions to limit swinging movement of said foot to a predetermined position.

9. In a test member, in combination, an elongated member, an elongated foot pivoted to one extremity of said elongated member and adapted to be folded into substantial alignment with said elongated member, said foot being heavier on one side of its pivotal mounting than on the other side thereof, said foot and said elongated member having cooperating portions to limit swinging movement of said foot to a predetermined position, said elongated member being provided with a sliding member for locking said foot in said predetermined position, said sliding member being disposed entirely within the cross-sectional boundaries of said elongated member.

10. In a test member, in combination, an elongated member having one of its extremities bifurcated, and an elongated foot disposed between said bifurcations and pivoted to said elongated member, said elongated member adjacent to said bifurcations being recessed for the reception of one swinging extremity of said foot, one extremity of said foot being fashioned for the attachment of a cord member for the manipulation of said foot.

11. In a test member, in combination, an elongated member having one of its extremities bifurcated, an elongated foot disposed between said bifurcations and pivoted to said elongated member, said elongated member adjacent to said bifurcations being recessed for the reception of one swinging extremity of said foot, and a locking member slidable relative to said elongated member adapted by gravity to lock said foot in predetermined angular relationship with said elongated member, one of the extremities of said foot being fashioned for the attachment of a cord member for the manipulation of said foot.

Signed at Chicago, Illinois, this 9th day of April, 1929.

ARTHUR J. WHITCOMB.
OLAF C. CALLOW.